(12) United States Patent
Wang et al.

(10) Patent No.: US 10,675,712 B2
(45) Date of Patent: Jun. 9, 2020

(54) HOT CRACKING REDUCTION IN ALUMINUM LASER WELDING

(71) Applicants: GM GLOBAL TECHNOLOGY OPERATIONS LLC, Detroit, MI (US); SHANGHAI JIAO TONG UNIVERSITY, Shanghai (CN)

(72) Inventors: Hui-Ping Wang, Troy, MI (US); Michael G. Poss, Rochester Hills, MI (US); Blair E. Carlson, Ann Arbor, MI (US); Fenggui Lu, Shanghai (CN); Haichao Cui, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 231 days.

(21) Appl. No.: 15/568,851

(22) PCT Filed: Apr. 30, 2015

(86) PCT No.: PCT/CN2015/078134
§ 371 (c)(1),
(2) Date: Oct. 24, 2017

(87) PCT Pub. No.: WO2016/172976
PCT Pub. Date: Nov. 3, 2016

(65) Prior Publication Data
US 2018/0111226 A1    Apr. 26, 2018

(51) Int. Cl.
*B23K 26/00*  (2014.01)
*B23K 9/00*  (2006.01)
(Continued)

(52) U.S. Cl.
CPC ........ *B23K 26/244* (2015.10); *B23K 26/0869* (2013.01); *B23K 26/26* (2013.01);
(Continued)

(58) Field of Classification Search
CPC ............ B23K 2101/18; B23K 2103/10; B23K 26/0869; B23K 26/244; B23K 26/26; B23K 26/32; B23K 37/0408
(Continued)

(56) References Cited

U.S. PATENT DOCUMENTS

| 4,682,002 A | * | 7/1987 | Delle Piane | ........... B23K 26/16 |
| | | | | 219/121.64 |
| 5,618,452 A | * | 4/1997 | Matubara | ............. B23K 26/123 |
| | | | | 219/121.63 |

(Continued)

FOREIGN PATENT DOCUMENTS

| DE | 102013001213 A1 | 7/2014 |
| JP | 2002331374 A | 11/2002 |
| WO | 03099505 A1 | 12/2003 |

OTHER PUBLICATIONS

International Search Report and Written Opinion for application No. PCT/CN2015/078134; dated Jan. 22, 2016; 11 pages.
(Continued)

*Primary Examiner* — Sang Y Paik
(74) *Attorney, Agent, or Firm* — Reising Ethington P.C.

(57) ABSTRACT

A method of laser welding a workpiece stack-up that includes two or three overlapping aluminum alloy workpieces involves constraining a free end of an overlapping portion of a first aluminum alloy workpiece against movement away from an underlying second aluminum alloy workpiece to counteract the thermally-induced forces that cause out-of-plane deformation of one or more of the aluminum alloy workpieces during laser welding. Such constraint of the free end of the first aluminum alloy workpiece may be accomplished by clamping, spot welding, or any other suitable practice. By constraining the free end of the first aluminum alloy workpiece, and thus inhibiting out-of-plane deformation of the aluminum alloy workpieces (Continued)

when laser welding is practiced in a nearby welding region, the occurrence of hot cracking is minimized or altogether eliminated in the final laser weld joint.

14 Claims, 4 Drawing Sheets

(51) Int. Cl.
*B23K 26/244* (2014.01)
*B23K 26/26* (2014.01)
*B23K 37/04* (2006.01)
*B23K 26/08* (2014.01)
*B23K 26/32* (2014.01)
*B23K 101/18* (2006.01)
*B23K 103/10* (2006.01)

(52) U.S. Cl.
CPC .......... *B23K 26/32* (2013.01); *B23K 37/0408* (2013.01); *B23K 2101/18* (2018.08); *B23K 2103/10* (2018.08)

(58) Field of Classification Search
USPC ............... 219/121.6–121.72, 136, 137 R
See application file for complete search history.

(56) References Cited

U.S. PATENT DOCUMENTS

| | | | | |
|---|---|---|---|---|
| 5,897,796 A | * | 4/1999 | Forrest | B23K 26/10 |
| | | | | 219/121.64 |
| 6,302,973 B1 | * | 10/2001 | Haszler | B23K 35/288 |
| | | | | 148/437 |
| 7,479,616 B2 | | 1/2009 | Wang et al. | |
| 2003/0154678 A1 | * | 8/2003 | Stanchfield | E04F 15/02005 |
| | | | | 52/468 |
| 2003/0217993 A1 | | 11/2003 | Stol et al. | |
| 2006/0011592 A1 | * | 1/2006 | Wang | B23K 26/032 |
| | | | | 219/121.64 |
| 2006/0054611 A1 | | 3/2006 | Stol et al. | |
| 2012/0298638 A1 | | 11/2012 | Beck et al. | |
| 2013/0228252 A1 | * | 9/2013 | Smeyers | C22C 21/10 |
| | | | | 148/537 |

OTHER PUBLICATIONS

Supplementary European Search Opinion and Report for EP Application No. 15 890 356.7 dated Dec. 3, 2018; 7 pages.

* cited by examiner

HOT CRACKING REDUCTION IN ALUMINUM LASER WELDING

TECHNICAL FIELD

The technical field of this disclosure relates generally to laser welding and, more particularly, to laser welding of overlapping aluminum alloy workpieces.

BACKGROUND

Laser welding is a metal joining process in which a laser beam is directed at a metal workpiece stack-up to provide a concentrated heat source capable of effectuating a weld joint between the component metal workpieces. In general, two or more metal workpieces are first aligned and stacked relative to one another such that their faying surfaces overlap and confront at an intended welding site. A laser beam is then directed at a top surface of the workpiece stack-up. The heat generated from the absorption of energy from the laser beam initiates melting of the metal workpieces and establishes a molten weld pool within the workpiece stack-up. The molten weld pool penetrates through the metal workpiece impinged by the laser beam and into the underlying metal workpiece or workpieces. When the laser beam has a high enough power density, a keyhole is created within the molten weld pool directly underneath the laser beam (a process known as "keyhole welding"). A keyhole is a column of vaporized metal derived from the metal workpieces within the workpiece stack-up and may include plasma.

The keyhole provides a conduit for energy absorption deeper into workpiece stack-up which, in turn, facilitates deeper penetration of the molten weld pool and a narrower weld pool profile. As such, the keyhole is normally controlled to penetrate into the workpiece stack-up across each faying interface, either fully or partially through the bottommost metal workpiece. The keyhole is typically created in very short order—on the order of milliseconds—once the laser beam impinges the top surface of the workpiece stack-up. After the keyhole is formed and stable, the laser beam is moved a short distance along a weld path. Such movement of the laser beam leaves behind a trail of molten workpiece material in the wake of the corresponding travel path of the keyhole and molten weld pool. This penetrating trail of molten workpiece material cools and solidifies in the same direction as the forward movement of the laser beam to provide a laser weld joint that fusion welds the workpieces together.

Many industries use laser welding as part of their manufacturing practice including the automotive, aviation, maritime, railway, and building construction industries, among others. Laser welding is an attractive joining process because it requires only single side access, can be practiced with reduced flange widths, and results in a relatively small heat-affected zone that minimizes thermal distortion. In the automotive industry, for example, laser welding can be used—and indeed it frequently is used—to join together metal workpieces during manufacture of the body-in-white (BIW) as well as finished parts that are installed on the BIW prior to painting. Some specific instances where laser welding may be used include the construction and attachment of load-bearing body structures within the BIW such as rail structures, rockers, A-, B-, and C-pillars, and underbody cross-members. Other specific instances where laser welding may also be used include non-load-bearing attachments within the BIW, such as the attachment of a roof to a side panel, and to join overlying flanges encountered in the construction of the doors, hood, and decklid. Both full and partial penetration laser welds may be employed when needed.

In an effort to incorporate lighter weight materials into a motor vehicle, and thus improve fuel economy, there has been a push to incorporate aluminum alloys into the vehicle platform wherever practical. A stack-up of overlapping aluminum alloy workpieces can certainly be joined in spot or seam fashion by laser welding. In some instances, however, particularly when at least one of the aluminum alloy workpieces is composed of a 5000 or 6000 series aluminum alloy, the laser weld joint may experience hot cracking which, in turn, can keep the joint from attaining its maximum strength. Hot cracking occurs during solidification of the molten aluminum alloy material produced by the laser beam when strain at the fusion boundary of the weld zone exceeds material ductility. This strain is believed to cause the liquid film between grains to break and form a cavity where insufficient liquid metal is available to backfill the cavity, thus inducing out-of-plane deformation of one or more of the overlapping aluminum alloy workpieces. When such deformation occurs, the resultant tensile strain imparted to the solidifying workpiece material causes a crack to propagate from a root(s) of the weld joint upwards through the weld joint to the surface of the workpiece stack-up acted on by the laser beam. A laser welding method that includes provisions to eliminate or at least reduce the chance of hot cracking without using a filler wire to add material to the molten aluminum alloy weld pool is therefore needed.

SUMMARY OF THE DISCLOSURE

A method of laser welding a workpiece stack-up that includes two or three overlapping aluminum alloy workpieces is disclosed. For example, in one embodiment, the workpiece stack-up may include first and second aluminum alloy workpieces having first and second faying surfaces, respectively, that confront and contact one another to provide a single faying interface within the stack-up. In another embodiment, the workpiece stack-up may include an additional third aluminum alloy workpiece situated under the second aluminum alloy workpiece. In such an embodiment, the first and third aluminum alloy workpieces have first and fourth faying surfaces, respectively, that confront and contact opposed second and third faying surfaces of the second aluminum alloy workpiece such that two faying interfaces are established within the stack-up. When a third aluminum alloy workpiece is present, the first and third aluminum alloy workpieces may be provided by separate and distinct parts or, alternatively, they may represent different portions of the same part, such as when an end portion of one part is folded and hemmed over an end portion of another part.

To help combat the occurrence of hot cracking in the final laser weld joint, a free end of an overlapping portion of the first aluminum alloy workpiece—which is the workpiece the laser beam is directed at and impinges first—is constrained against movement away from the adjacent underlying second aluminum alloy workpiece to counteract the thermally-induced forces that cause out-of-plane deformation of one or more of the aluminum alloy workpieces in the stack-up. The free end of the first aluminum alloy workpiece is constrained proximate a free edge of the workpiece between the free edge and a welding region where the laser beam is directed for forming the laser weld joint; that is, the laser beam is directed at the first aluminum alloy workpiece inward of the constraint a distance away from the free edge of the first aluminum alloy workpiece. The constraint applied to the first aluminum alloy workpiece may take on a variety of forms. For example, in one implementation, the free end of the first aluminum alloy workpiece may be clamped against the adjacent underlying second aluminum alloy workpiece. And, in another implementation, the free end of the first aluminum alloy workpiece may be spot welded to the adjacent underlying second aluminum alloy workpiece. Other alternative measures for constraining the first aluminum alloy workpieces may of course be employed besides clamping and spot welding.

With the first aluminum alloy workpiece constrained, the laser welding process proceeds and a laser beam is directed towards and impinges the first aluminum alloy workpiece in the welding region. The laser beam initiates a keyhole surrounded by a molten aluminum alloy weld pool within the workpiece stack-up.

The molten aluminum alloy weld pool fully penetrates the first aluminum alloy workpiece and further extends into the stack-up such that it traverses each faying interface within the stack-up. In some instances, the molten aluminum alloy weld pool also fully penetrates each of the other aluminum alloy workpieces, thus extending through the entire workpiece stack-up. In other instances, the molten aluminum alloy weld pool only partially penetrates the bottom-most aluminum alloy workpiece. Once the keyhole and the molten aluminum alloy weld pool have been created, the laser beam is conveyed along a weld seam within the welding region. The advancing movement of the laser beam leaves behind a trail of molten aluminum alloy material in the wake of the corresponding travel path of the keyhole and molten aluminum alloy weld pool. The trail of molten aluminum alloy material cools and solidifies into a laser weld joint that fusion welds the workpieces together.

DETAILED DESCRIPTION

The disclosed method of laser welding a workpiece stack-up, which includes overlapping aluminum alloy workpieces, minimizes or altogether prevents hot cracking within the produced laser weld joint. As will be further described with reference to the specific embodiments described below, the disclosed laser welding method combats the hot cracking problem by constraining a free end of an overlapping portion of the aluminum alloy workpiece that faces and is impinged first by the laser beam so that the free end does not freely deform out-of-plane and away from an adjacent underlying aluminum alloy workpieces during solidification of molten aluminum alloy material into the laser weld joint. In this way, the laser weld joint can be obtained without concentrating significant tensile strain at the root(s) of the weld joint at a time when the joint is somewhat more susceptible to crack propagation (i.e., during cooling and solidification of the molten aluminum alloy material into the laser weld joint). The disclosed method can be performed without using a filler wire to add material to the molten aluminum alloy material.

Figure 1:
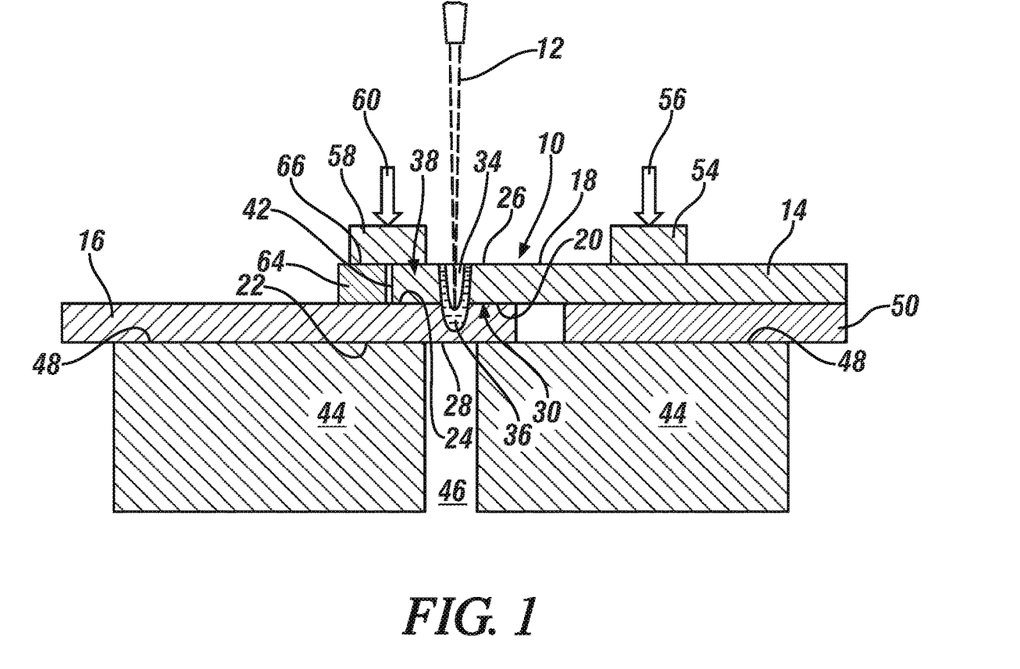
FIG. 1 is a cross-sectional illustration that depicts one embodiment of the disclosed laser welding method in which a workpiece stack-up is laser welded and a free end of the first aluminum alloy workpiece is constrained by clamping.
Figure 2:
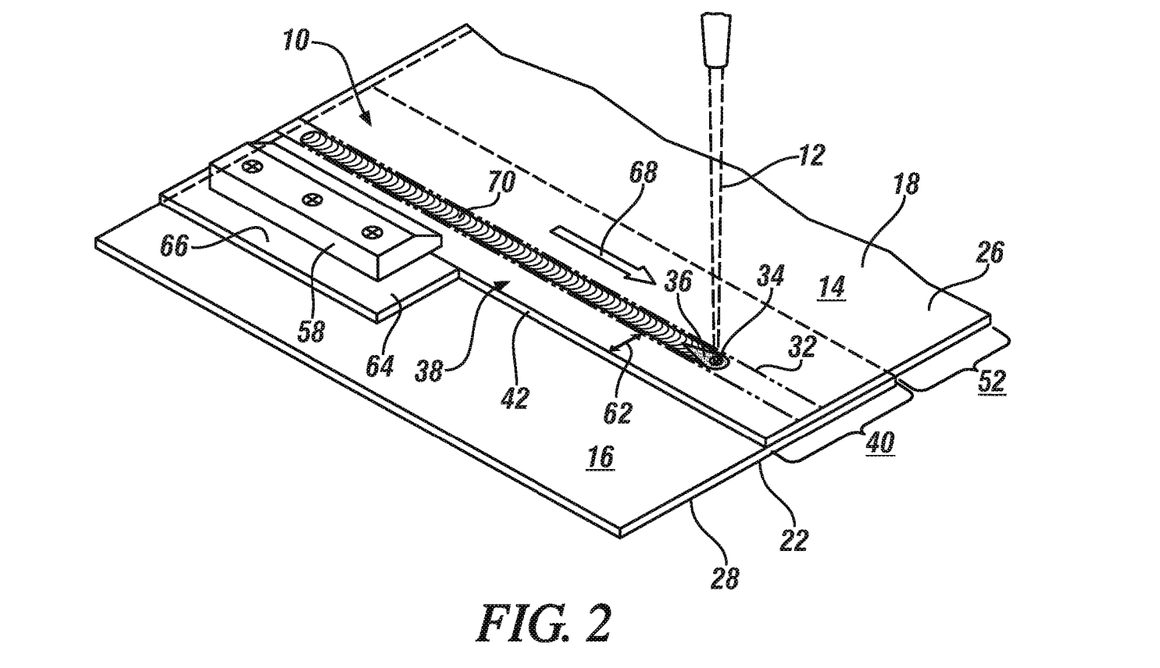
FIG. 2 is a perspective view of the disclosed laser welding method depicted in FIG. 1.

FIGS. 1-2 schematically illustrate one embodiment of the disclosed method in which a workpiece stack-up 10 undergoes laser welding by a laser beam 12. The workpiece stack-up 10 includes a first aluminum alloy workpiece 14 and a second aluminum alloy workpiece 16 that are arranged in a lapped configuration. The first aluminum alloy workpiece 14 includes a first outer surface 18 and an opposing first faying surface 20, and the second aluminum alloy workpiece 14 includes a second outer surface 22 and an opposing second faying surface 24. Relative to the position of the source of the laser beam 12, the first outer surface 18 of the first aluminum alloy workpiece 12 provides a top surface 26 of the workpiece stack-up 10 and the second outer surface 22 of the second aluminum alloy workpiece 14 provides an oppositely-facing bottom surface 28 of workpiece stack-up 10.

The first and second faying surfaces 20, 24 of the first and second aluminum alloy workpieces 14, 16 overlap and contact one another to establish a faying interface 30 at least through a welding region 32 located within the lapped portion of the workpiece stack-up 10. The welding region 32 is the zone within the workpiece stack-up 10 where the laser beam 12 melts the workpieces 14, 16. The welding region 32 extends from the top surface 26 to the bottom surface 28 along the path traveled by the laser beam 12 and has a width that is equal to the greatest width—usually at the top surface 26—of a molten aluminum alloy weld pool created by the laser beam 12 and a resultant weld joint obtained from the weld pool, as will be described in greater detail below. The size and location of the welding region 32 is generally known before laser welding commences due to the fact that the characteristics (e.g., power level, travel velocity, focal position, etc.) and travel path of the laser beam 12 are predetermined in advance of welding.

Each of the first and second aluminum alloy workpieces 14, 16 comprises an aluminum alloy substrate composed of a laser weldable aluminum alloy composition that includes at least 85 wt. % aluminum, and more preferably at least 90 wt. % aluminum. The aluminum alloy substrate included in each workpiece 14, 16 may be a wrought sheet metal layer, plate, or extrusion, although it may also be a casting or other weldable substrate if desired, and may include a natural refractory oxide coating or an alternative applied surface coating such as zinc, tin, or a metal conversion coating. Taking into account the thickness of the aluminum alloy substrate and any additional surface coatings that may be present, each of the first and second aluminum alloy workpieces 14, 16 may have thicknesses in the range of 0.3 mm to about 6.0 mm and, more specifically, from about 0.5 mm to about 3.0 mm, at least at the welding region 32. And while the first and second aluminum alloy workpieces 14, 16 may be the same in all relevant respects, they are not required to be, as the workpieces 14, 16 included in the workpiece stack-up 10 may have different aluminum alloy compositions, forming techniques (e.g, wrought or cast), and/or thicknesses.

While hot cracking is a weld defect that may occur during laser welding of a wide variety of aluminum alloy compositions, it is more of a concern when at least one, or even both, of the first or second aluminum alloy workpieces 14, 16 includes a 5000 series or a 6000 series wrought aluminum alloy substrate. A 5000 series aluminum alloy is a non-heat-treatable aluminum/magnesium alloy that typically includes between 0.2 wt. % and 6.2 wt. % magnesium along with other common alloy constituents such as chromium, copper, iron, lead, manganese, silicon, and zinc. A 6000 series aluminum alloy is a heat-treatable (generally by precipitation hardening) aluminum/magnesium/silicon alloy that typically includes between 0.2 wt. % and 1.5 wt. % magnesium and 0.2 wt. % and 2.0 wt. % silicon along with other common alloy constituents such as bismuth, chromium, copper, iron, lead, manganese, silicon, tin, and zinc. A few specific examples of 5000 series and 6000 series aluminum alloys that often subjected to welding in a variety of contexts in multiple industries are AA5754, AA5182, AA6111 and AA6022.

The laser beam 12 is directed at the top surface 26 of the workpiece stack-up 10, which, here, is provided by the first outer surface 18 of the first aluminum alloy workpiece 14. The laser beam 12—typically a near infrared fiber-delivered solid-state laser beam—may be delivered by a remote scanning optic laser head, in which beam guidance is achieved using rotatable mirrors and a z-focus lens, or it may be delivered by a traditional laser head, in which beam guidance is achieved by moving the laser head itself relative to the workpieces being welded. In any event, however delivered, the laser beam 12 impinges the top surface 26 of the workpiece stack-up 10 within the welding region 32, and heat from the concentrated laser beam 12 is absorbed by the stack-up 10. The power density of the laser beam 12 is set high enough that the first and second aluminum alloy workpieces 14, 16 vaporize in the immediate vicinity of the laser beam 12 to create a keyhole 34. The absorbed heat from the laser beam 12 also induces lateral melting of the first and second aluminum alloy workpieces 14, 16 outward and around the keyhole 34 to establish a molten aluminum alloy weld pool 36 that surrounds the keyhole 34. The penetration depth of the keyhole 34 and the molten aluminum alloy weld pool 36 can be readily controlled depending on whether full or partial penetration of the workpiece stack-up 10 is desired.

The use of the laser beam 12 to form a weld joint between the first and second aluminum alloy workpieces 14, 16 that is better able to resist hot cracking is facilitated by constraining a free end 38 of the first aluminum alloy workpiece 14 against movement away from the underlying second aluminum alloy workpiece 16. As shown generally in FIG. 1, the free end 38 of the first aluminum alloy workpiece 14 is a terminal end of an overlapping portion 40 of the first aluminum alloy workpiece 14 that extends beyond the welding region 32 and includes a perimeter edge 42 of the workpiece 14. By constraining the free end 38 of the first aluminum alloy workpiece 14 against movement away from the underlying second aluminum alloy workpiece 16 during laser welding, as will be described in greater detail below, the first and second aluminum alloy workpieces 14, 16 do not thermally deform out of plane to a significant extent. Put differently, the first and second aluminum alloy workpieces 14, 16 are held together so that they do not curl apart at the faying interface 30 in opposite directions during laser welding, which in turn minimizes the tensile strain on the root(s) of the ultimately-formed weld joint where hot cracking is believed to originate.

The embodiment shown in FIGS. 1-2 constrains the first aluminum alloy workpiece 14 to counteract out-of-plane deformation by clamping the free end 38 of the first aluminum alloy workpiece 14 against the second aluminum alloy workpiece 16. Here, as shown, the bottom surface 28 of the workpiece stack-up (also the second outer surface 22 of the second aluminum alloy workpiece 16) is laid across two support plates 44 separated by a gap 46. The bottom surface 28 of the workpiece stack-up 10 spans the gap 46 and rests upon complimentary upward-facing surfaces 48 of the support plates 44. To keep the first and second aluminum alloy workpieces 14, 16 aligned along their faying interface 30 through at least the welding region 32, a support shim 50 is fitted between an overhang portion 52 of the first aluminum alloy workpiece 14 and the support plate 44 that lies beneath. One or more clamps 54 may engage the top surface 26 of the workpiece stack-up 10 (also the first outer surface 18 of the first aluminum alloy workpiece 14) within the overhang portion 52 of the first aluminum alloy workpiece 14 and apply a downward force 56 against the first aluminum alloy workpiece 14 and alongside the welding region 32 over the support shim 50. The one or more clamps 54 may be a spot clamp tool that includes a spot pad or knob as the workpiece engaging portion, may be a line clamp tool that includes an elongated bar or block as the workpiece engaging portion, or may be some combination of the two.

The free end 38 of the overlapping portion 40 of the first aluminum alloy workpiece 14 is also acted on by one or more clamps 58. Specifically, as shown, the one or more clamps 58 engage the top surface 26 of the workpiece stack-up 10 (also the first outer surface 18 of the first aluminum alloy workpiece 14) proximate the perimeter edge 42 of the free end 38. The clamp(s) 58 apply a downward force 60 against the free end 38 of the first aluminum alloy workpiece 14 alongside the welding region 32 and urge the perimeter edge 42 against the second faying surface 24 of the second aluminum alloy workpiece 16. This downward force 60 holds the free end 38 of the first aluminum alloy workpiece 14 against the second aluminum alloy workpiece 16 during laser welding and is maintained by the clamp(s) 58 at least until the weld joint has been solidified. The clamp(s) 58, like before, may be a spot clamp tool or a line clamp tool or a combination of the two.

In FIG. 2, the one or more clamps 58 are illustrated as a line clamp tool. The depicted line clamp tool includes a wedge clamping block that engages the top surface 26 of the workpiece stack-up 10 and extends over the perimeter edge 42 of the free end 38. The clamping block is urged against the top surface 26 to impart the downward force 60, and thus holds the free end 38 against the underlying second aluminum alloy workpiece 16, by tightening screws or some other compression mechanism. It should be noted that here, in FIG. 2, the line clamp tool is shown engaging only a portion of the free end 38 alongside the welding region 32 for purposes of clarity. In application, the depicted line clamp tool would extend alongside the entire welding region 32 or a plurality of similar line clamp tools would be arranged end-to-end alongside the welding region 32. If a plurality of clamping tools is employed, the several tools do not necessarily have to be tightly fit together at their ends; rather, the ends of adjacent tools can be separated so long as enough of the free end 38 is engaged that out-of-plane deformation of the whole free end 38 along the welding region 32 is avoided.

To assist clamping the free end 38 when a distance 62 (FIG. 2) between the perimeter edge 42 and the welding region 32 is limited, a clamping support shim 64 may be disposed adjacent to the free end 38 over the second aluminum alloy workpiece 16. The clamping support shim 64 has a height that corresponds to the height of the free end 38 of the first aluminum alloy workpiece 14 and has an upper surface 66. The one or more clamps 58 can thus engage and direct and the downward force 60 against both the top surface 26 of the workpiece stack-up 10 (also the first outer surface 18 of the first aluminum alloy workpiece 14) and the upper surface 66 of the clamping support shim 64 in order to more effectively clamp the free end 38 against the second aluminum alloy workpiece 16. The clamping block shown in FIG. 2, for instance, partially rests on a clamping support shim 64 as a way to better support the clamping block. The use of the clamping support shim 64 may not be necessary when the distance 62 between the perimeter edge 42 and the welding region 32 is large enough that the one or more clamps 58 can easily access and engage the free end 38.

With the free end 38 of the first aluminum alloy workpiece 14 clamped in place, the laser beam 12 is used to fusion weld the first and second aluminum alloy workpieces 14, 16 together. As shown best in FIG. 2, the laser beam 12 is directed toward, and impinges, the top surface 26 of the workpiece stack-up 10 to form the keyhole 34 and surrounding molten aluminum alloy weld pool 36 such that the weld pool 36 traverses the faying interface 30 and either partially or fully penetrates through the stack-up 10. To accomplish this, the laser beam 12 preferably has a power between 2 kW and 10 kW. The laser beam 12 is then moved relative to the top surface 26 along a weld path in a forward welding direction 68, such as along the linear seam depicted in FIG. 2, preferably at a travel velocity of 1.0 m/min to 7.0 m/min. In doing so, the keyhole 34 and molten aluminum alloy weld pool 36 follow a corresponding travel path and leave behind a penetrating trail of molten aluminum alloy material in their wake. The penetrating trail of molten aluminum alloy material quickly cools and solidifies in the same direction as the forward movement of the laser beam 12 to provide a laser weld joint 70 comprised of re-solidified aluminum alloy workpiece material. The laser weld joint 70 fusion welds the first and second aluminum alloy workpieces 14, 16 together.

As previously described, the thermal mechanics associated with cooling and solidifying the trail of molten aluminum alloy material into the final laser weld joint 70 are believed to be responsible for inducing forces that would otherwise cause out-of-plane deformation of the first and second aluminum alloy workpieces 14, 16. For this reason, the one or more clamps 58 are maintained in position and continue to apply the downward force 60 to the free end 38 of the first aluminum alloy workpiece 14 during the entire time the laser beam 12 is impinging the top surface 26 of the workpiece stack-up 10. This allows any thermally-induced forces that may develop from solidification shrinkage and/or thermal contraction to subside without stressing the root(s) of the weld joint 70. Eventually, after the laser beam 12 is removed from the top surface 26 of the workpiece stack-up 10, and weld joint 70 is obtained and solidified, the one or more clamps 58 are released. The weld joint 70 is now ready for service and is likely free of hot cracking weld defects.

Figure 3:
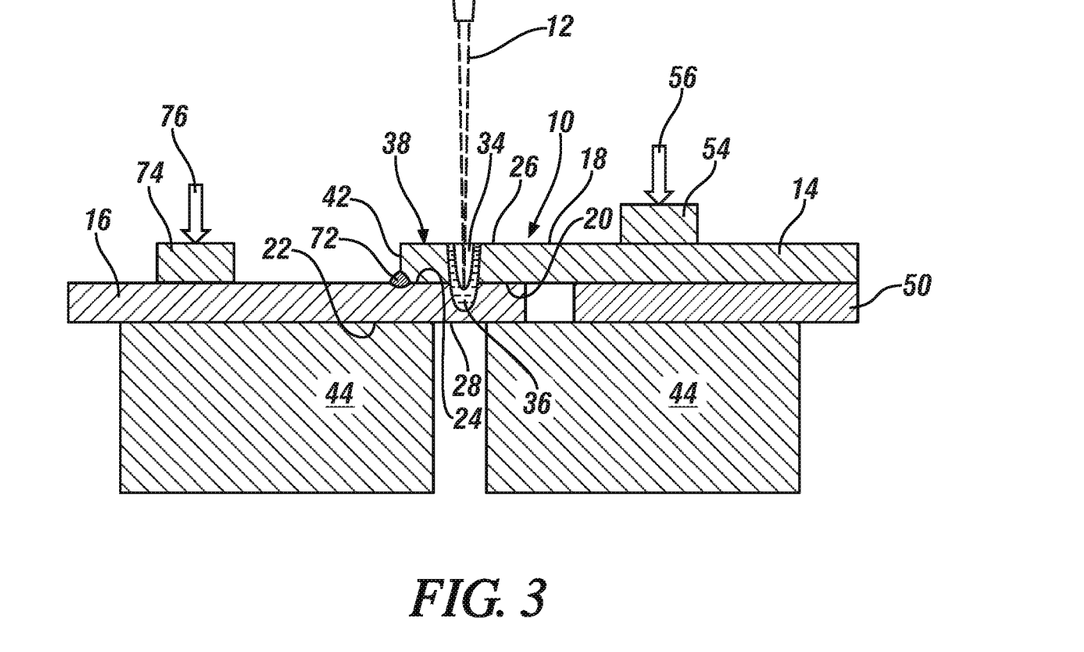
FIG. 3 is a cross-sectional illustration that depicts another embodiment of the disclosed laser welding method in which a workpiece stack-up is laser welded and a free end of the first aluminum alloy workpiece is constrained by spot welding.
Figure 4:
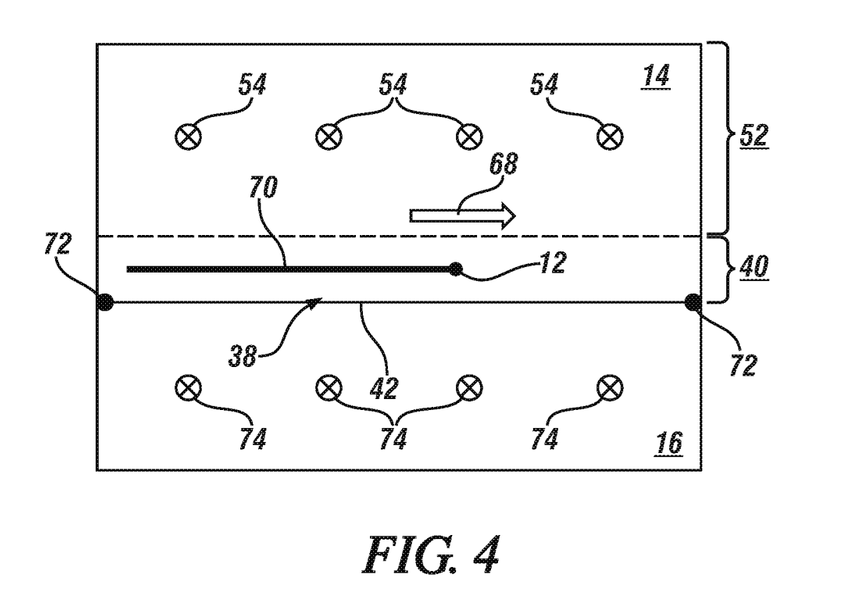
FIG. 4 is a plan view from an above vantage point of the disclosed laser method depicted in FIG. 2.

Other alternative ways for constraining the free end 38 of the first aluminum alloy workpiece 14 against the second aluminum alloy workpiece 16 are of course possible besides what is shown and described in FIGS. 1-2. For example, as shown in FIGS. 3-4, the free end 38 of the first aluminum alloy workpiece 14 may be constrained against movement away from the underlying second aluminum alloy workpiece 16 by spot welding the free end 38 to the underlying second aluminum alloy workpiece 14 by way of one or more spot welds 72. The spot welds 72 may be formed by the laser beam 12 or they may be resistance spot welds that have been previously formed between the first and second aluminum alloy workpieces 14, 16. Apart from the primary difference in constraining techniques, the entire discussion set forth above with respect to FIGS. 1-2 is applicable here and is intended to apply equally to the embodiment shown in FIGS. 3-4. The same reference numerals used in FIGS. 1-2 are thus used again in FIGS. 3-4 to represent like components and like functionality. As such, only the primary differences between the embodiment shown in FIGS. 1-2 and the embodiment shown in FIGS. 3-4 will be described in further detail. A discussion of common components and their functions is omitted.

The use of one or more spot welds 72 to constrain the free end 38 of the first aluminum alloy workpiece 14 may be formed by the laser beam 12 prior to forming the weld joint 70 in the lapped portion of the first and second aluminum alloy workpieces 14, 16. The spot welds 72 may be formed at any location between the welding region 32 and the perimeter edge 42 of the free end 38 to ensure that the spot welds 72 do not interfere with the travel path of the keyhole 34 and molten aluminum alloy weld pool 36 within the welding region 32. For instance, as shown in FIGS. 3-4, the one or more spot welds 72 may be a plurality of fillet edge spot welds formed at the intersection of the perimeter edge 42 of the first aluminum alloy workpiece 14 and the underlying second faying surface 24. These fillet edge spot welds are spaced apart alongside the welding region 32 as needed to evenly constrain the free end 38. And while not shown here, the one or more spot welds 72 may also be formed between the faying surfaces 20, 24 of the first and second aluminum alloy workpieces 14, 16 inward of the perimeter edge 42 in addition to, or in lieu of, the depicted fillet edge spot welds.

The one or more spot welds 72 are particularly useful when the distance 62 (FIG. 2) between the perimeter edge 42 and the welding region 32 is limited such that the use of the one or more clamps 56 to engage the free end 38 presents a practical challenge. In this scenario, the laser beam 12 can form the one or more spot welds 72 in preparation for forming the laser weld joint 70 to ensure proper constraint of the free end 38 of the first aluminum alloy workpiece 14, and one or more clamps 74 may engage the second aluminum alloy workpiece 16 and apply a downward force 76 against the second aluminum alloy workpiece 16 and the support plate 44 that lies beneath. The laser beam 12 may then transition to impinging the top surface 26 of the workpiece stack-up 10 and forming the weld joint 70 within the welding region 32 to fusion weld the first and second aluminum alloy workpieces 14, 16 together. Here, of course, the one or more spot welds 72 are permanent spot weld joints that will remain part of the workpiece stack-up 10 after the laser beam has been removed and the laser weld joint 70 has been obtained.

Figure 5:
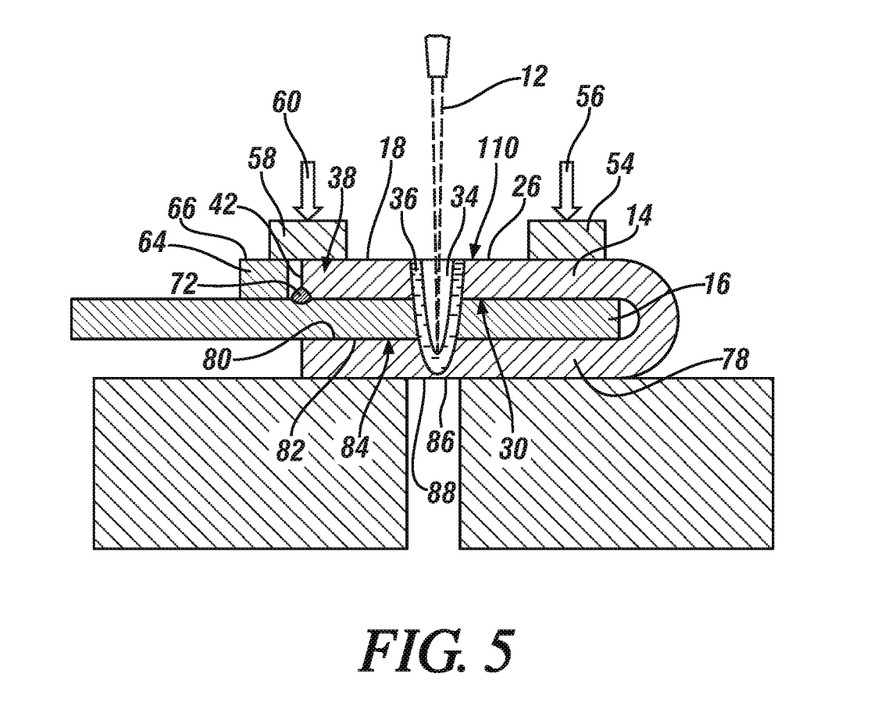
FIG. 5 is a cross-sectional illustration that depicts an embodiment of the disclosed laser welding method in which a workpiece stack-up that includes three aluminum alloy workpieces is laser welded and a free end of the first aluminum alloy workpiece is constrained.

The above embodiments illustrate the disclosed method in conjunction with a workpiece stack-up that includes two aluminum alloy workpieces. The disclosed method, however, is not so limited; it can also be used in conjunction with a workpiece stack-up that includes three aluminum alloy workpieces, as illustrated in FIG. 5. There, a variation of the workpiece stack-up, which is denoted by reference numeral 110, is shown that includes a third aluminum alloy workpiece 78 in addition to the first and second aluminum alloy workpieces 14, 16. The composition, thickness, and other attributes of the third aluminum alloy workpiece 78 are the same as the first and second aluminum alloy workpieces 14, 16 as described above.

The third aluminum alloy workpiece 78 is situated under and in contact with the second aluminum alloy workpiece 16 and overlaps the second aluminum alloy workpiece 16 at least through a welding region 32 located within the lapped portion of the workpiece stack-up 110. When so arranged, the third aluminum alloy workpiece 78 includes a fourth faying surface 80 that overlaps and contacts a third faying surface 82 of the second aluminum alloy workpiece 16 to establish a second faying interface 84 through the welding region 32. The third aluminum alloy workpiece 78 also includes a second outer surface 86 that, in this embodiment, provides a bottom surface 88 of the workpiece stack-up 10 that faces in the opposite direction of the top surface 26 of the stack-up (still provided by the first outer surface 18 of the first aluminum alloy workpiece 14).

The free end 38 of the overlapping portion 40 of the first aluminum alloy workpiece 14 can be constrained against movement away from the underlying second aluminum alloy workpiece 16 in the same ways as before despite the presence of the additional third aluminum alloy workpiece 78. For example, as shown in FIG. 5, one or more clamps 58 and/or one or more spot welds 72 may be used to constrain the free end 38 in the manners described above. Next, after the free end 38 has been constrained, the laser beam 12 is directed toward, and impinges, the top surface 26 of the workpiece stack-up 110 to form the keyhole 34 and surrounding molten aluminum alloy weld pool 36 such that the weld pool 36 traverses both faying interfaces 30, 84 and either partially or fully penetrates through the stack-up 110. The laser beam 12 is then moved relative to the top surface 26 along a weld path, such as along the same linear seam depicted in FIG. 2, to provide a laser weld joint 70 comprised of re-solidified aluminum alloy workpiece material. The laser weld joint 70 fusion welds the first, second, and third aluminum alloy workpieces 14, 16, 78 together.

EXAMPLES

Figure 6:
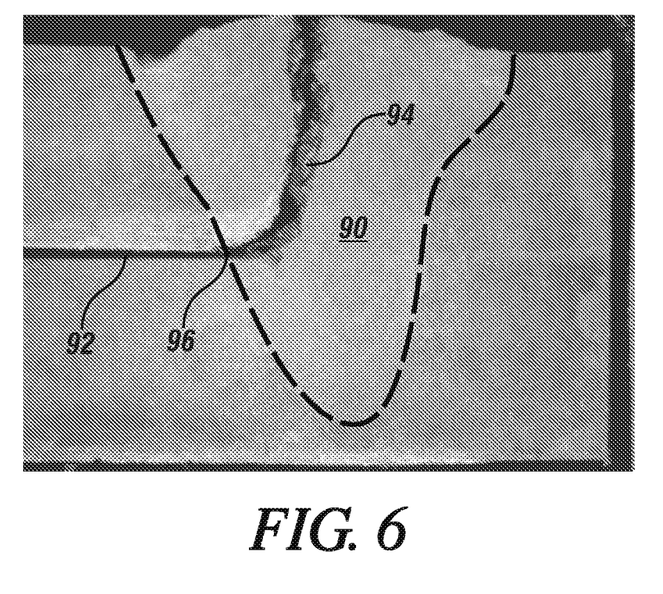
FIG. 6 is a cross-sectional photomicrograph of a laser weld joint that was formed without using practices of the disclosed laser welding method.

The following examples demonstrate specific practices of the disclosed laser welding method in comparison to a conventional laser welding practice that did not apply the concepts of the disclosed method. Referring now to FIG. 6, a cross-sectional photomicrograph of a laser weld joint 90 formed without using the disclosed method is shown. There, a pair of overlapping 2.5 mm thick AA6013 workpieces was laser welded along a linear seam with a 0.6 mm focal diameter laser beam. The laser beam had a power of 7.2 kW and was focused on the top surface of the upper-most workpiece while moving along the top surface at a travel velocity of 3.5 m/min. As evidenced by a gap 92 between the laser welded workpieces, out-of-plane deformation of the upper-most aluminum alloy workpiece caused a crack 94 to propagate upwards from a root 96 of the joint 90 to the top of the joint 90 where it was visually observable. Such hot cracking was not observed in the following examples when the disclosed laser welding method was employed.

Example 1

Figure 7:
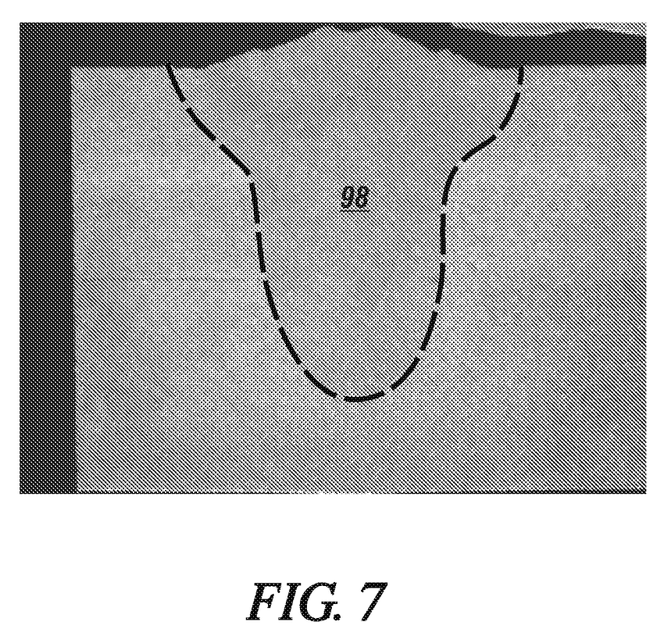
FIG. 7 is a cross-sectional photomicrograph of a laser weld joint that was formed using one embodiment of the disclosed laser welding method.

Example 1 employed the same basic conditions as in the comparative example of FIG. 6; that is, a pair of overlapping 2.5 mm thick AA6013 workpieces was laser welded along a linear seam with a 0.6 mm focal diameter laser beam. And, like before, the laser beam had a power of 7.2 kW and was focused on the top surface of the upper-most workpiece while moving along the top surface at a travel velocity of 3.5 m/min. In this example, however, a free end of the upper-most workpiece was constrained against movement away from the lower-most workpiece by placing a clamping plate alongside the linear seam where welding occurred. As can be seen from the cross-sectional photomicrograph shown in FIG. 7, a laser weld joint 98 was formed that fusion welded the two workpieces together. The laser weld joint 98 did not show any observable signs of hot cracking.

Example 2

Figure 8:
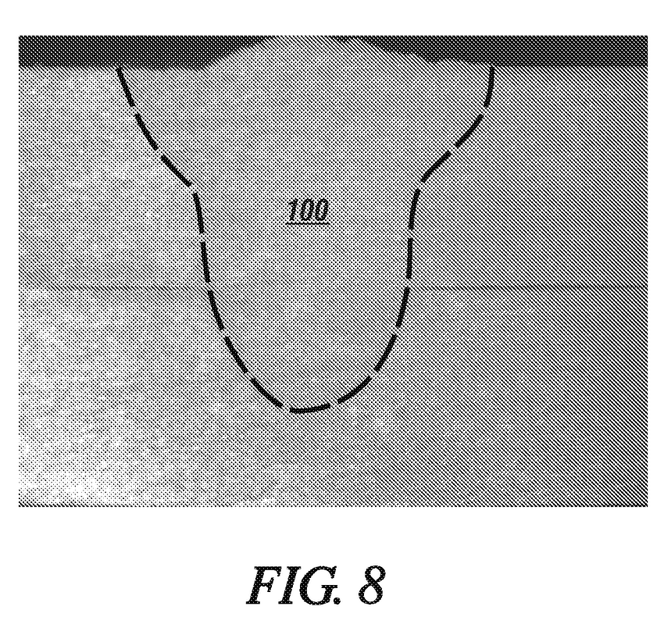
FIG. 8 is a cross-sectional photomicrograph of a laser weld joint that was formed using another embodiment of the disclosed laser welding method.

Example 2 employed the same basic conditions as in the comparative example of FIG. 6; that is, a pair of overlapping 2.5 mm thick AA6013 workpieces was laser welded along a linear seam with a 0.6 mm focal diameter laser beam. And, like before, the laser beam had a power of 7.2 kW and was focused on the top surface of the upper-most workpiece while moving along the top surface at a travel velocity of 3.5 m/min. In this example, however, a free end of the upper-most workpiece was constrained against movement away from the lower-most workpiece by forming two fillet edge laser spot welds between the workpieces. In particular, a fillet edge laser spot weld was formed at opposite sides of the overlapping workpieces, with one spot weld being formed behind the starting point of the travel path of the laser beam and one spot weld being formed ahead of the ending point of the laser beam travel path. As can be seen from the cross-sectional photomicrograph shown in FIG. 8, a laser weld joint 100 was formed that fusion welded the two workpieces together. The laser weld joint 100 did not show any observable signs of hot cracking.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A method of laser welding a workpiece stack-up that includes two or three aluminum alloy workpieces, the method comprising:

providing a workpiece stack-up that includes at least a first aluminum alloy workpiece and an underlying second aluminum alloy workpiece that overlap and contact one another to establish a first faying interface between the workpieces, the first aluminum alloy workpiece providing a top surface of the workpiece stack-up and including an overlapping portion that overlaps with the second aluminum alloy workpiece;

constraining a free end of the overlapping portion of the first aluminum alloy workpiece against movement away from the underlying second aluminum alloy workpiece, wherein constraining the free end of the overlapping portion of the first aluminum alloy workpiece comprises clamping the free end against the second aluminum alloy workpiece by placing a clamping support shim onto the second aluminum alloy workpiece adjacent to the free end of the overlapping portion of the first aluminum alloy workpiece and engaging, with the one or more clamps, an outer surface of the first aluminum alloy workpiece and an upper surface of the clamping support shim to direct a downward force against the first aluminum alloy workpiece and to further urge a perimeter edge of the free end against the second aluminum alloy workpiece;

directing a laser beam at the top surface of the workpiece stack-up to create a keyhole within the workpiece stack-up and a molten aluminum alloy weld pool that surrounds the keyhole, the molten aluminum alloy weld pool traversing at least the first faying interface established between the first and second aluminum alloy workpieces; and conveying the laser beam and the associated keyhole and molten aluminum alloy weld pool relative to the top surface of the workpiece stack-up along a travel path within a welding region, the welding region being located within the overlapping portion of the first aluminum alloy workpiece inward of the free end.

2. The method set forth in claim 1, wherein the first aluminum alloy workpiece has a first outer surface and a first faying surface, and the second aluminum alloy workpiece has a second outer surface and a second faying surface, the first outer surface of the first aluminum alloy workpiece providing the top surface of the workpiece stack-up and the second outer surface of the second aluminum alloy workpiece providing a bottom surface of the workpiece stack-up, and wherein the first and second faying surfaces of the first and second aluminum alloy workpieces overlap and contact each other to establish the first faying interface.

3. The method set forth in claim 1, wherein the workpiece stack-up further includes a third aluminum alloy workpiece situated underneath the second aluminum alloy workpiece, the first aluminum alloy workpiece having a first outer surface and a first faying surface, the third aluminum alloy workpiece having a second outer surface and a fourth faying surface, and the second aluminum alloy workpiece having opposed second and third faying surfaces, wherein the first outer surface of the first aluminum alloy workpiece provides the top surface of the workpiece stack-up and the second outer surface of the third aluminum alloy workpiece provides a bottom surface of the workpiece stack-up, wherein the first faying surface of the first aluminum alloy workpiece overlaps and contacts the second faying surface of the second aluminum alloy workpiece to establish the first faying interface, and wherein the fourth faying surface of the third aluminum alloy workpiece overlaps and contacts the third faying surface of the second aluminum alloy workpiece to establish a second faying interface.

4. The method set forth in claim 3, wherein the molten aluminum alloy weld pool traverses both the first and second faying interfaces.

5. The method set forth in claim 1, wherein at least one of the first or second aluminum alloy workpieces comprises a non-heat-treatable aluminum alloy substrate that includes between 0.2 wt. % and 6.2 wt. % magnesium.

6. The method set forth in claim 1, wherein at least one of the first or second aluminum alloy workpieces comprises a heat-treatable aluminum alloy substrate that includes between 0.2 wt. % and 1.5 wt. % magnesium and 0.2 wt. % and 2.0 wt. % silicon.

7. The method set forth in claim 1, wherein constraining the free end of the overlapping portion of the first aluminum alloy workpiece further comprises spot welding the free end to the second aluminum alloy workpiece.

8. The method set forth in claim 7, wherein spot welding the free end to the second aluminum alloy workpiece comprises:

using the laser beam to form one or more spot welds between the free end of the first aluminum alloy workpiece and the underlying second aluminum alloy workpiece before directing the laser beam at the top surface of the workpiece stack-up and conveying the laser beam along the weld path within the welding region.

9. The method set forth in claim 1, wherein the laser beam is conveyed relative to the top surface of the workpiece stack-up along a linear travel path to form a linear laser weld joint between at least the first and second aluminum alloy workpieces.

10. A method of laser welding a workpiece stack-up that includes two or three aluminum alloy workpieces, the method comprising:

providing a workpiece stack-up that includes at least a first aluminum alloy workpiece and an underlying second aluminum alloy workpiece, the first aluminum alloy workpiece comprising an overlapping portion that overlaps and contacts the second aluminum alloy workpiece to establish a first faying interface between the workpieces, the first aluminum alloy workpiece providing a top surface of the workpiece stack-up, and wherein each of the first and second aluminum alloy workpieces comprises either (1) a non-heat-treatable aluminum alloy substrate that includes between 0.2 wt. % and 6.2 wt. % magnesium or (2) a heat-treatable aluminum alloy substrate that includes between 0.2 wt. % and 1.5 wt. % magnesium and 0.2 wt. % and 2.0 wt. % silicon;

constraining a free end of the overlapping portion of the first aluminum alloy workpiece against movement away from the underlying second aluminum alloy workpiece, wherein constraining the free end of the overlapping portion of the first aluminum alloy workpiece comprises clamping the free end against the second aluminum alloy workpiece by placing a clamping support shim onto the second aluminum alloy workpiece adjacent to the free end of the overlapping portion of the first aluminum alloy workpiece and engaging, with the one or more clamps, an outer surface of the first aluminum alloy workpiece and an upper surface of the clamping support shim to direct a downward force against the first aluminum alloy workpiece and to further urge a perimeter edge of the free end against the second aluminum alloy workpiece;

directing a laser beam at the top surface of the workpiece stack-up to create a keyhole within the workpiece stack-up and a molten aluminum alloy weld pool that surrounds the keyhole, the molten aluminum alloy weld pool traversing at least the first faying interface established between the first and second aluminum alloy workpieces; and conveying the laser beam and the associated keyhole and molten aluminum alloy weld pool relative to the top surface of the workpiece stack-up along a travel path within a welding region, the welding region being located within the overlapping portion of the first aluminum alloy workpiece and being spaced inward from a perimeter edge of the free end.

11. The method set forth in claim 10, wherein constraining the free end of the overlapping portion of the first aluminum alloy workpiece further comprises using the laser beam to form one or more spot welds between the free end of the first aluminum alloy workpiece and the underlying second aluminum alloy workpiece before directing the laser beam at the top surface of the workpiece stack-up and conveying the laser beam along the weld path within the welding region.

12. The method set forth in claim 10, wherein the workpiece stack-up further comprises a third aluminum alloy workpiece that overlaps and contacts the second aluminum alloy workpiece to establish a second faying interface within the workpiece stack-up, and wherein the molten aluminum alloy weld pool traverses both the first and second faying interfaces.

13. A method of laser welding a workpiece stack-up that includes two or three aluminum alloy workpieces, the method comprising:

constraining a free end of an overlapping portion of a first aluminum alloy workpiece against movement away from an underlying second aluminum alloy workpiece, wherein constraining the free end of the overlapping portion of the first aluminum alloy workpiece comprises (i) placing a clamping support shim, which has a height that corresponds to a height of the overlapping portion of the first aluminum alloy workpiece, onto the second aluminum alloy workpiece adjacent to the free end of the overlapping portion of the first aluminum alloy workpiece so that the clamping support shim and the free end are separated by a gap, and (ii) engaging an outer surface of the overlapping portion of the first aluminum alloy workpiece and an upper surface of the clamping support shim with one or more clamps that extend across the gap to direct a downward force against the first aluminum alloy workpiece and to further urge a perimeter edge of the free end against the second aluminum alloy workpiece;

conveying a laser beam relative to the outer surface of the overlapping portion of the first aluminum alloy workpiece along a travel path located inward of the perimeter edge of the free end, conveyance of the laser beam causing a molten aluminum alloy weld pool that traverses at least a faying interface of the first and second aluminum alloy workpieces to be moved along the travel path of the laser beam thus leaving behind a trail of molten aluminum alloy material; and allowing the trail of molten aluminum alloy material to solidify into a laser weld joint comprising re-solidified aluminum alloy workpiece material that fusion welds at least the first and second aluminum alloy workpieces together;

wherein the free end of the overlapping portion of the first aluminum alloy workpiece is constrained during the entire time the laser beam is conveyed along the travel path within the welding region and is not released until the trail of molten aluminum alloy material has solidified into the laser weld joint.

14. The method set forth in claim 13, wherein each of the first and second aluminum alloy workpieces comprises either (1) a non-heat-treatable aluminum alloy substrate that includes between 0.2 wt. % and 6.2 wt. % magnesium or (2) a heat-treatable aluminum alloy substrate that includes between 0.2 wt. % and 1.5 wt. % magnesium and 0.2 wt. % and 2.0 wt. % silicon.

* * * * *